United States Patent
Korenaga et al.

Patent Number: 5,502,456
Date of Patent: Mar. 26, 1996

[54] DISPLAY APPARATUS FOR VEHICLES

[75] Inventors: Hidenobu Korenaga; Makoto Takashima; Tadashi Iino, all of Susono, Japan

[73] Assignee: Yazaki Corporation, Tokyo, Japan

[21] Appl. No.: 486,263

[22] Filed: Jun. 7, 1995

Related U.S. Application Data

[63] Continuation of Ser. No. 230,246, Apr. 20, 1994, abandoned.

[30] Foreign Application Priority Data

Apr. 21, 1993 [JP] Japan ................................. 5-094204

[51] Int. Cl.$^6$ ................................................. G09G 5/00
[52] U.S. Cl. ................................................. 345/9; 359/630
[58] Field of Search .................... 345/7, 8, 9; 359/40, 359/630, 632, 640; 340/980

[56] References Cited

U.S. PATENT DOCUMENTS

| | | | |
|---|---|---|---|
| 5,059,957 | 10/1991 | Todoriki et al. | 345/7 |
| 5,153,775 | 10/1992 | Itami et al. | |
| 5,157,549 | 10/1992 | Suzuki et al. | 345/7 |
| 5,229,754 | 7/1993 | Aoki et al. | 345/9 |
| 5,291,184 | 3/1994 | Iino | 345/7 |

FOREIGN PATENT DOCUMENTS

| | | |
|---|---|---|
| 2-141720 | 5/1990 | Japan . |
| 2-294615 | 12/1990 | Japan . |
| 3-117271 | 12/1991 | Japan . |
| 5-22156 | 3/1993 | Japan . |

*Primary Examiner*—Tommy P. Chin
*Assistant Examiner*—Gin Goon
*Attorney, Agent, or Firm*—Armstrong, Westerman, Hattori, McLeland & Naughton

[57] ABSTRACT

The display apparatus for vehicles being reduced in reflection at the external light suppression prisms disposed on the surface of the display device and providing a bright display image, in which included are the display device and the external light suppression prisms consisting of first and second prisms being stacked together by directing the prism apex angles in opposite directions to each other and disposed close to the display surface of the display device, a reflecting member to reflect the display light emitted from the display device, which light has passed through the prisms, toward the viewing point of the driver, and a polarized direction rotating means being disposed between the prisms and the reflecting member for rotating the polarization direction of the display light by 90 degrees, whereby the display light is emitted as a P-polarization light with respect to the reflecting surface of the reflecting member.

6 Claims, 3 Drawing Sheets

DISPLAY APPARATUS FOR VEHICLES

This applicatoin is a continuation application Ser. No. 08/230,246 filed Apr. 20, 1994, now abadoned.

BACKGROUND OF THE INVENTION

1) Field of the Invention

The present invention relates to a display apparatus for motor vehicles in which a displayed image on a display device is reflected by a reflecting member and led to a viewing point of a driver so that the displayed image of an indicator can be recognized by the driver as a virtual image behind the reflecting member.

2) Description of the Prior Art

There has been available a display apparatus for motor vehicles wherein an indicator image can be observed as a virtual image at a remote location in front of the vehicle, in which a display device made up of fluorescent display tubes, liquid crystal display elements for displaying information, or the like, is installed in a dashboard by facing a display side upwards. The image light emitted from the display device is passed through an opening of the dashboard and reflected by a reflecting member, such as a windshield, toward the viewing point of the driver, so that the virtual image of the displayed image is visible by the driver behind the reflection member, i.e., in front of the vehicle.

In this type of display apparatus, however, since the image light emitted from the display device is reflected at two points, i.e. at inner and outer surfaces of the windshield, a ghost image is produced.

To eliminate such problems, it has been proposed to employ such configurations as disclosed in Japanese Patent Application Laid-Open Publication Nos. Heisei 2-294615 and 2-141720, wherein the display device is arranged to polarize the image displaying light in S-polarization, and a polarization direction adjusting means, which changes the incoming S-polarization light into a P-polarization light, is interposed between laminated glass plates which forms the windshield, so that no unwanted reflection may take place at the outer surface of the windshield and the ghost image has been prevented from occurring.

However, in this type of display apparatus, since a screen of the display device is faced upwards, external light rays such as rays of sun light incident upon the screen of the display device through the opening of the dashboard have caused a so-called washout phenomenon which makes the display very difficult to see.

In order to eliminate the problems encountered with the prior art display devices, the inventor has proposed a configuration shown in FIG. 2. In this configuration, immediately above the display surface of the indicator or display device 1, provided are first and second prisms 11, 12 having the same apex angles θ and stack them together so that their apex angles θ of the prisms are directed opposite directions to each other.

According to the configuration above, when there is an external light from the windshield 4 incident to the indicator 1 through the opening 2a of the dashboard 2, it is reflected at an interface 11a of the first and second prisms 11, 12 stacked together, and directed to a direction shown by an arrow F, so that there will be no external light incident to the display surface of the indicator 1. Hence, there is no possibility for the display image of the indicator to be washed out by the external light.

Further, since the prisms 11, 12 of the same shape are stacked together in opposite directions to each other, the image light emitted from the indicator 1 is hardly affected when it passes through the prisms. This ensures the viewer that the displayed image visible from the viewing point 6 is not distorted, and allows to recognize a virtual image behind the reflecting member 3 or in front of the motor vehicle.

No problem may be encountered with the configuration proposed by the inventor, however, in the apparatuses disclosed in the Japanese Patent Application Laid-Open Nos. Heisei 2-294615 and 2-141720 wherein the windshield is used as a reflecting member, it may cause a problem. In the latter said apparatuses, if the aforesaid prisms are employed in order to prevent unwanted phenomenon from causing by the external light, the S-polarization light emitted from the display device 1, which device consists of a liquid crystal display element 1a with a backlight 1b, is reflected with higher reflectance as compared with that of normal light at the prism 12 and air interfaces A, B and that at the prism 11 and air interfaces C, D. This results in the decrease of the intensity of the incident light to the windshield 4. Hence, the brightness of the displayed image is decreased.

The phenomenon described above can easily be understood from graphs of FIGS. 4 and 5. That is, the above phenomenon is caused by the fact that the incident light from the air having the refractive index 1 into the prism having the refractive index 1.5 has the same reflectance for S-polarization light and P-polarization light up to the incident angle of approximately 30°, as shown in FIG. 4; however, the reflectance becomes higher for the S-polarization light than the P-polarization light when the incident angle is at or above 30°.

On the contrary, as shown in FIG. 5, when the light enters from the prism having the refractive index of 1.5 into the air having the refractive index of 1, the reflectance for the S-polarization light and P-polarization light are equal up to the incident angle of approximately 15°. However, for greater incident angles up to the total reflection angle of about 42°, the S-polarization light has a higher reflectance than that of the P-polarization light. Therefore, when the prisms are arranged in such configuration as shown in FIG. 3, a transmittance of the incident light to the prism for the S-polarization light will be decreased to 30–40%. In case of the P-polarization light, the reduction of the transmittance will be of about 10%.

In FIGS. 4 and 5, ⌀b (=56.3°, 33.7°) is the Brewster angle which is the angle of incidence at which no reflection of the P-polarization light will occur. Further ⌀c (=41.8°) indicates a total reflection angle.

SUMMARY OF THE INVENTION

The present invention has been accomplished to overcome the above-mentioned drawbacks and its objective is to provide a display apparatus for vehicles, which is capable of reducing the interface reflection of the external light suppression from prisms arranged on the surface of the display device and thereby producing a display image with enhanced brightness.

To achieve the above objective, the display apparatus of this invention comprises: a display device; first and second prisms stacked together with apex angles of the prisms directed opposite directions to each other, the first and second prisms being disposed close to the display surface of the display device; and a reflecting member to reflect the display light that has passed through those prisms toward the viewing point of the driver; wherein the display light of the display device is emitted as a P-polarization light with respect to the reflecting surface of the reflecting member; whereby a polarized direction rotating means to rotate, by an amount of 90 degrees, the display light that has passed through the prisms is disposed between the prisms and the reflecting member.

In accordance with the configuration above, it is possible to eliminate the unwanted effects causing from the external light. Furthermore, since the emitted display light from the display device is the P-polarization light, there is little reflection at the prism and the air interface and a large percentage of the light will pass through the prism. The display light that has passed through the prisms is rotated by 90 degrees the polarized direction rotating means, so that the P-polarization light is rotated to S-polarization light which is the incident light to the reflecting member. When the reflecting member consists of the windshield, the S-polarization light is reflected with a high reflectance, and produces a bright display image. In addition to the above, by applying a member, such as disclosed in the Japanese Patent Application Laid-Open No. Heisei 2-294615, to the interface between combined glass plates of the windshield, the possibility of causing ghost image can be decreased considerably.

DETAILED DESCRIPTION OF PREFERRED EMBODIMENT

Figure 4:
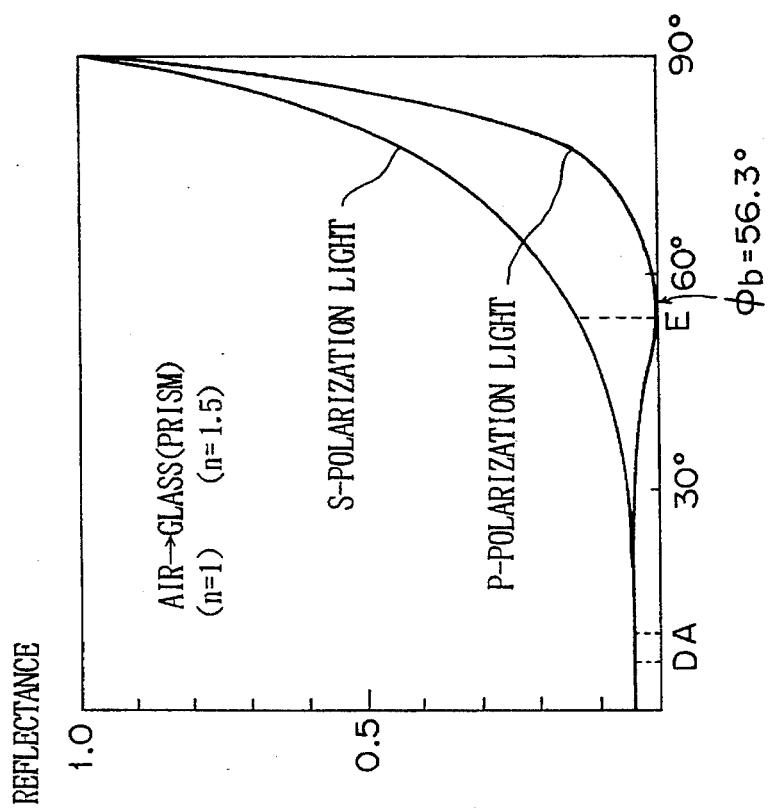
FIG. 4 is a graph showing the difference of the reflectance between the S-polarization light and P-polarization light when the incidence of the light is from air to glass.

Now, one embodiment of this invention will be described by referring to the accompanying drawings. Components identical or corresponding to those of the conventional apparatus are given like reference numerals.

Figure 1:
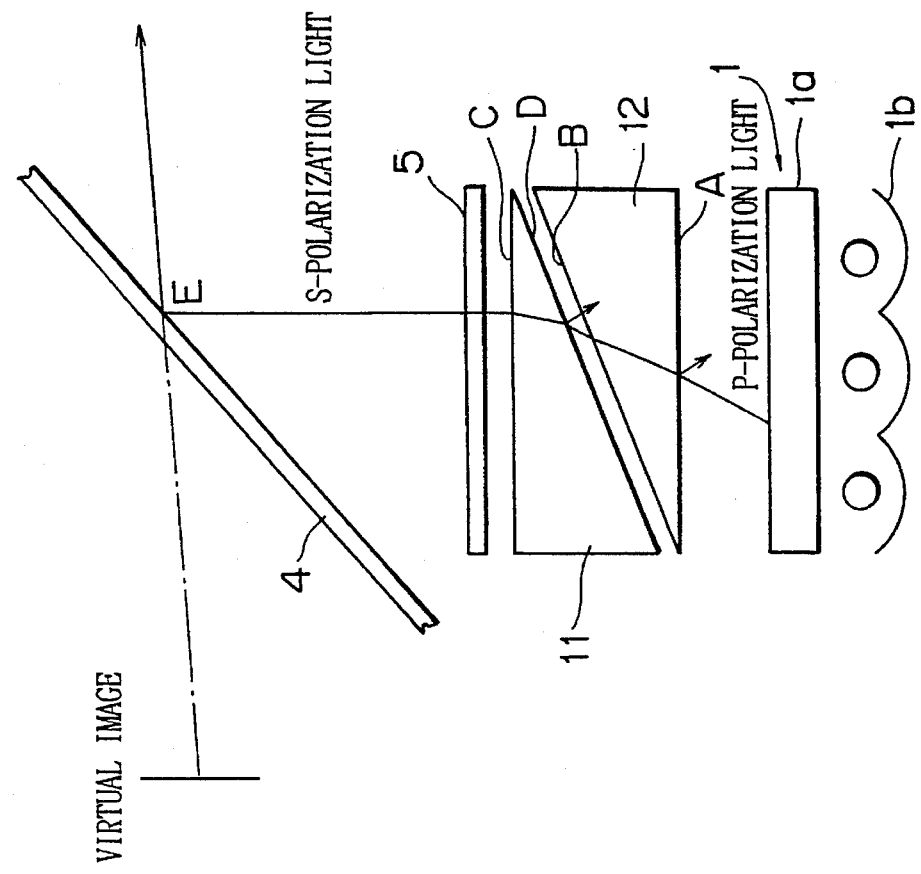
FIG. 1 is a side view of a display apparatus embodying the present invention.

FIG. 1 shows one embodiment of the display apparatus for vehicles in accordance with this invention.

As shown in FIG. 1, the display device 1 of this embodiment consists of a transmission type liquid crystal display element 1a having a backlight 1b. Polarizers provided at the both surfaces of the display device are so arranged as to emit a display light as a P-polarization light against the reflecting surface of the windshield 4.

A polarized direction rotating means 5 is arranged to be facing to the surface of the first prism 11. The polarized direction rotating means 5 is comprised of a TN-type liquid crystal panel or ½ wavelength plate and acts to rotate the polarized direction of the display light that has passed through the second and first prisms 12, 11 by an amount of 90°. That is, the display light that has passed through the polarized direction rotating means 5 becomes an S-polarization light the oscillation of which is in vertical to a plane of incidence of the windshield 4.

Figure 5:
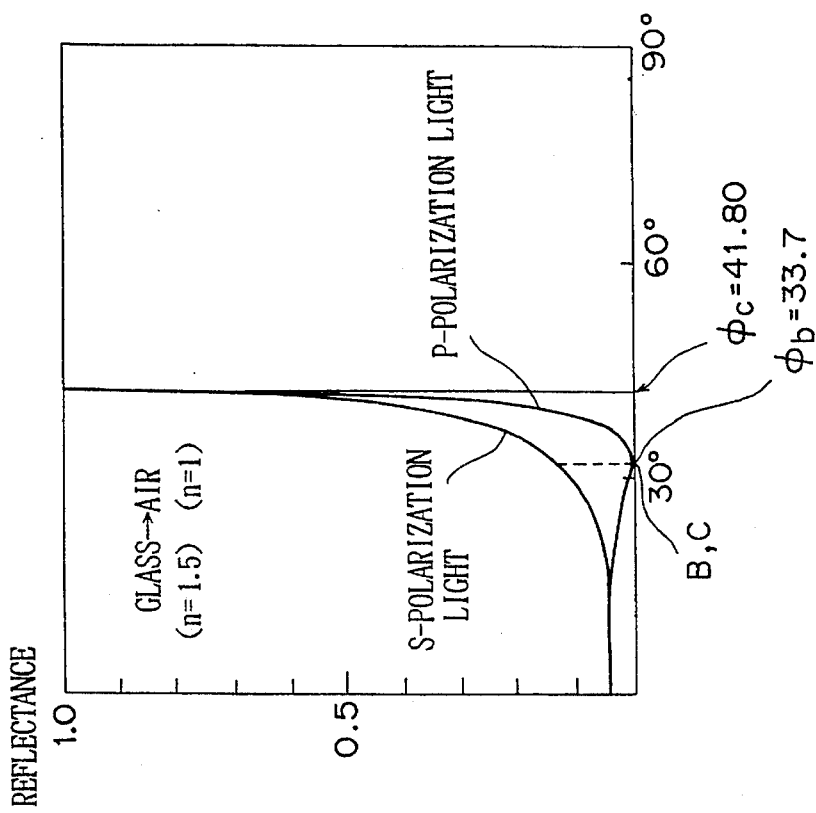
FIG. 5 is a graph showing the difference of the reflectance between the S-polarization light and P-polarization light when the incidence of the light is from glass to air.
Figure 2:
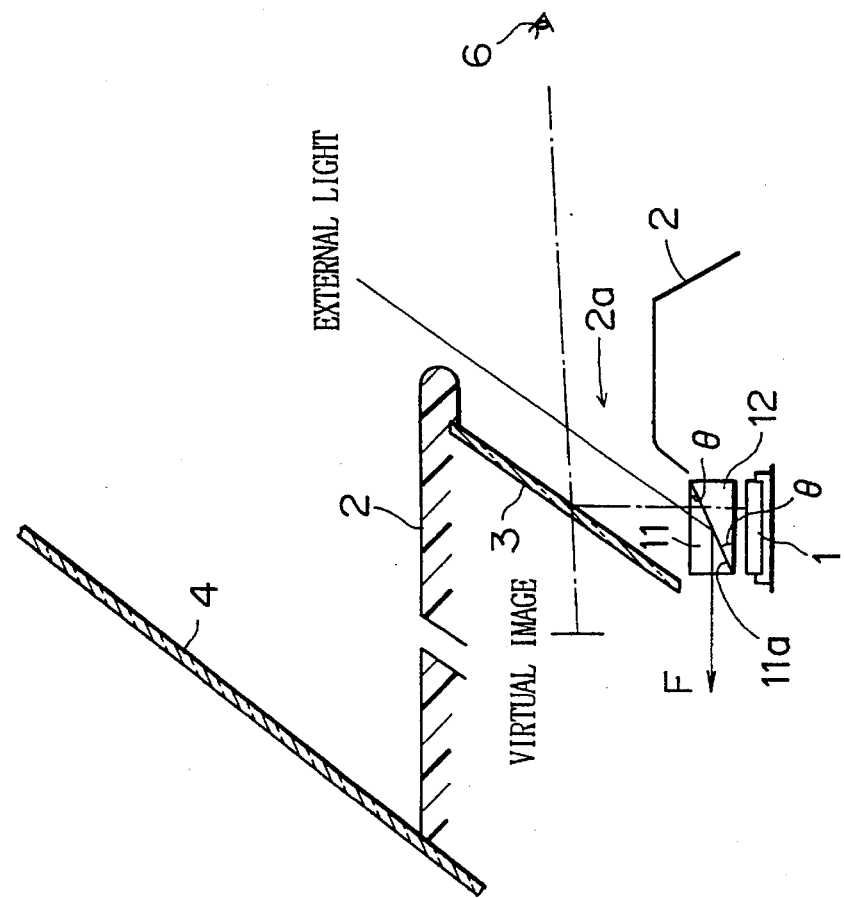
FIG. 2 is a side view of a conventional display apparatus which has prisms to alleviate unwanted effects of external light.
Figure 3:
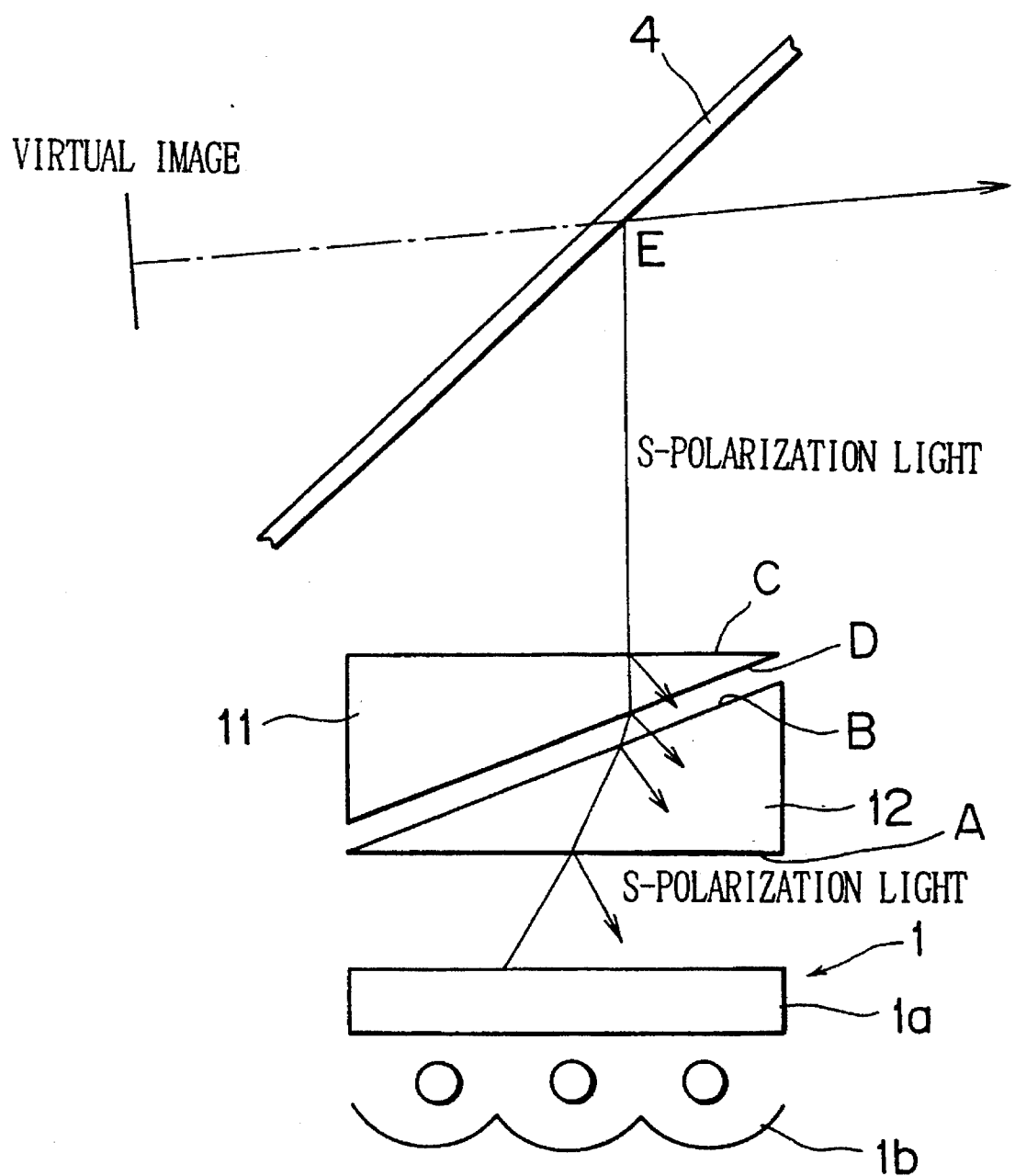
FIG. 3 is a side view of the display apparatus for explaining the problem to be encountered therewith when the display light of the display device is polarized to a S-polarization light, with respect to the windshield which is used as a reflecting member, to increase the reflectance of the windshields.

In this arrangement, when the apex ø angles e of the first and second prisms 11, 12 which may be formed of glass or resin are set to the desired angles at which the external light is suppressed, the P-polarization display light emitted from the display device 1 is reflected at first prism 11 and air interfaces A, B and second prism 12 and air interfaces C, D with smaller reflectance than that of the S-polarization light. Reduction of the reflectance is particularly significant at the prism and air interfaces B, C. This in turn increases the transmittance of the prisms 11, 12. The points A, B, C, D of FIGS. 4 and 5 designate the angles of incidence to the prism 12 and air interfaces A, B and that to the prism 11 and air interfaces C, D. Further, character E designates an angle of incidence at which the display light enters the windshield 4. These points are shown for the purpose of comparing the reflectance of the S-polarization light and P-polarization light.

Since the display light that has passed through the prisms 11, 12 is rotated in its polarized direction by the amount of 90° with the polarized direction rotating means 5, so that the light becomes an S-polarization light and impinges on the surface of the windshield 4. Hence, the reflectance at the windshield 4 becomes higher for the S-polarization light than for the P-polarization light, thus increasing the amount of display light that reaches to the viewing point of the driver, who is then able to observe a bright image.

The decrease of transmittance by the prisms 11, 12 is approximately 30 to 40% for the display light which is polarized into the S-polarization light, whereas the decrease of transmittance for the P-polarization light is approximately 10%. Therefore, when the polarization of the display light incident upon the prisms is changed to the P-polarization light, the increase of transmittance is 20 to 30%. If the transmittance of the liquid crystal panel or ½ wavelength plate is considered to be 95%, it is possible to increase the overall transmittance by order of 15 to 25%.

As described above, in accordance with the present invention, the prisms are utilized for preventing external light from causing unwanted effects by having the display light emitted from the display device polarized into a P-polarization light so that, the reflection at the prism and air interface is considerably decreased and the transmittance of the prisms is greatly improved. Further, since the polarized direction of the display light that has passed through the prisms is rotated by 90° with use of the polarized direction rotating means, the display light incident upon the reflecting member becomes the S-polarization light. When the windshield is employed for the reflecting member, because of the fact that the reflectance of the windshield is comparatively high, it is possible to get a bright display image as the high reflectance of the windshield is combined with the increased transmittance of the prisms by the P-polarization.

What is claimed is:

1. A display apparatus for vehicles comprising:

a display device;

first and second prisms stacked together with the prism apex angles being directed in opposite directions to each other, the first and second prisms being disposed in close relation to the display surface of the display device;

a reflecting member to reflect the display light that has passed through the prisms toward the viewing point of a driver of the vehicle;

means for emitting the display light from the display device as a P-polarization light through said stacked prisms and toward the reflecting surface of the reflecting member; and polarized direction rotating means disposed between the prisms and the reflecting member to rotate by 90 degrees to change the direction of light polarization from P-polarization light to S-polarization light the polarized direction of the display light which has passed the prisms wherein the light caused to impinge on the reflecting member is S-polarization light.

2. A display apparatus as defined in claim 1, wherein said display device is a transmission type liquid crystal display element having a backlight.

3. A display apparatus as defined in claim 1, wherein said polarized direction rotating means is comprised of a TN-type liquid crystal panel.

4. A display apparatus as defined in claim 1, wherein said polarized direction rotating means is comprised of ½ wavelength plate.

5. A display apparatus as defined in claim 1, wherein said reflecting member comprises windshield means.

6. A display apparatus as defined in claim 1, wherein said first and second prisms are made of glass or resin.

* * * * *